UNITED STATES PATENT OFFICE.

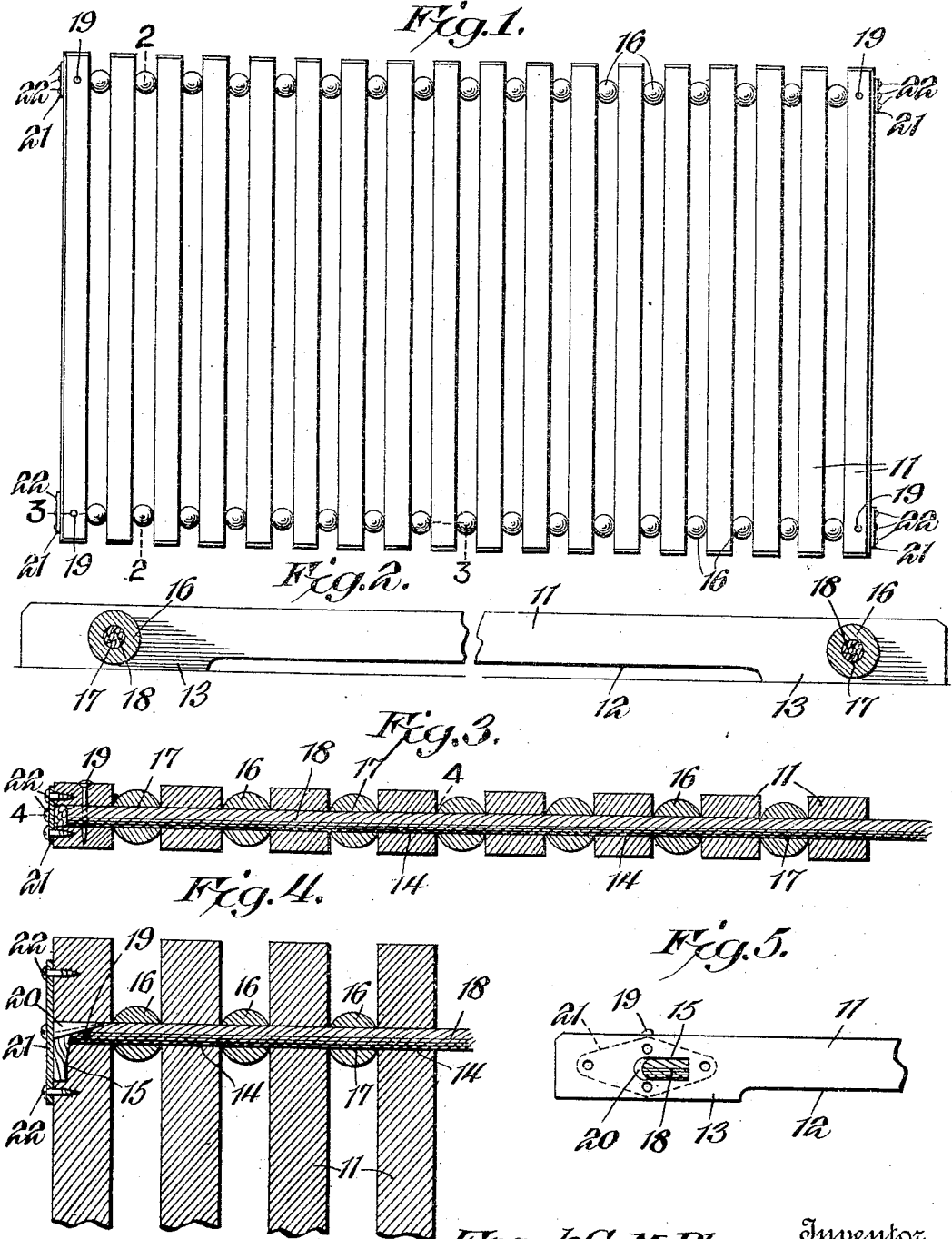

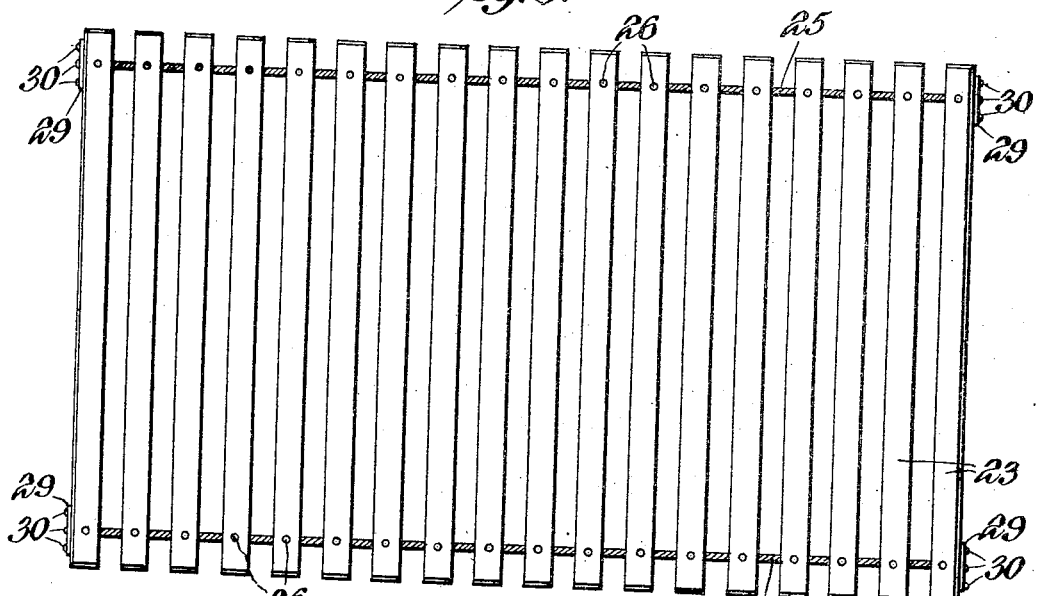

FRANK G. McPHERSON, OF BEAVER FALLS, PENNSYLVANIA.

MAT OR TREAD.

945,575.  Specification of Letters Patent.  Patented Jan. 4, 1910.

Application filed September 21, 1908. Serial No. 454,080.

*To all whom it may concern:*

Be it known that I, FRANK G. McPHERSON, a citizen of the United States, residing at Beaver Falls, in the county of Beaver and State of Pennsylvania, have invented a new and useful Mat or Tread, of which the following is a specification.

The primary object of the present invention is to provide novel matting or tread means for use in bars, soda fountains, street cars, and various other places, which can be manufactured at comparatively small cost, is very flexible so that it can be doubled or rolled into small compass, will maintain a perfectly flat condition, and is not apt to become bent or misshapen.

A further and important object is to provide a structure that is elastic so as to make it more comfortable for those who may have to stand thereon, and also leaves an unobstructed space beneath it for the distribution of drippage or other liquids that may accumulate.

In the drawings:—Figure 1 is a plan view of a mat or tread constructed in accordance with the present invention. Fig. 2 is a sectional view on the line 2—2 of Fig. 1, and on an enlarged scale. Fig. 3 is a sectional view on the line 3—3 of Fig. 1. Fig. 4 is a horizontal sectional view substantially on the line 4—4 of Fig. 3. Fig. 5 is a detail view of a portion of one of the end slats, with the cap removed. Fig. 6 is a plan view of a slightly modified form of construction. Fig. 7 is a detail view therethrough on an enlarged scale. Fig. 8 is a sectional view substantially on the line 8—8 of Fig. 7. Fig. 9 is a horizontal sectional view. Fig. 10 is a view of a portion of one of the end slats with the holding cap removed.

Similar reference numerals designate corresponding parts in all the figures of the drawings.

Referring first to the embodiment disclosed in Figs. 1-5 inclusive, the mat or tread consists of a plurality of spaced slats 11, which are preferably constructed of wood, and have their under sides cut away longitudinally, as shown at 12, the cut-away portions terminating short of the ends of the slats to produce flat bottom supporting feet 13. Through the thickened end portions of the slats are formed openings 14, and the outermost or end slats have channels 15 in their outer sides which communicate with said openings.

Interposed between the slats are sets of separator elements preferably in the form of spheres 16, which have openings 17 therethrough alined with the openings 14. Cables 18 pass through different sets of alined openings, these cables being preferably of manila rope or other similar material coated with a water-proof composition. The ends of the cables 18 pass through the openings in the outermost slats, and are bent so as to lie in the channels 15. Nails or pins 19 are preferably passed through the end slats and through the cables to temporarily hold them in place until the said ends are secured. The securing means is shown in the form of wedges 20 that are substantially crescent shaped in cross section, as illustrated in Fig. 5, these wedges being driven into the openings of the end slats and having their outer ends flush with the outer faces of the cables. These wedges force the cables firmly against the corners formed between the openings 14 and channels 15 in the end slats of the mat, so that they materially contribute in holding the end slats in place. The strains tending to disconnect the end slats from the cable are not exerted entirely on the nails 19 because of the clamping action of the wedges and the holding of the extremities of the cables in the channels 15. Cap plates 21 are located over the channels, the ends of the cables and the wedges, said plates being held in place by screws 22 or other suitable devices. The plates therefore not only constitute a finish for the structure, but hold the ends of the cables in the channels and maintain the wedges in place.

The cap plates 21, besides serving as retainers for the wedges 20 and as protectors for excluding moisture from the ends of the rope, have the further additional function of reinforcing devices for the end strips adjacent the corners of the mat. By providing the openings 14 and channels 15 in the end slats for receiving the extremities of the ropes 18, there is a tendency to weaken the slats at these points, and as the cap plates 21 extend to opposite sides of the openings and are fastened to the end slats, the extremities of the latter are materially strengthened.

There are many advantages for this structure. In the first place, by having separator elements with opposite rounded faces bearing against the slats, very flexible joints are secured that will permit the mat to be rolled into small compass or doubled and this rolling action does not seriously affect the cable. Furthermore an elastic support is provided by cutting away the under sides of the slats, and this affords communication between the various spaces produced between the slats so that drippage or other liquid can distribute itself or flow away from beneath the mat. The fastening means for the ends of the cables is also advantageous in that it is simple, yet entirely effective and maintains the elements of the mat structure in properly coöperative relation.

Referring now to the embodiment disclosed in Figs. 6–10 inclusive, it will be noted that a plurality of slats 23 are employed similar in all respects to those of the above described device. These slats have openings 24 in their thickened end portions, and through the openings are passed cables 25. The separator elements are dispensed with, the cables being heavy enough so as not to double between the slats. Fasteners 26 are passed through the ends of each slat and intersect the cables. The end portions of said cables are engaged in channels 27 cut in the outer sides of the end slats, and wedges 28, driven into the openings 26, of said end slats, act as anchors for the cable ends. Cap plates 29 are located over said ends and over the wedges and are secured in place by suitable screws 30.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a mat, the combination with spaced slats, the end slats having openings therethrough, and channels in their outer sides that communicate with said openings, there being corners formed between the said channels and openings of a flexible cable connecting the slats, said cable passing through the openings in the end slats and having its ends seated in the channels, means securing said ends engaged with the said corners, metal reinforcing plates secured to the outer faces of the end slats and extending to opposite sides of the openings thereof, and fastenings for securing the said plates rigidly in place.

2. In a mat, the combination with spaced slats, the end slats having openings therethrough, and channels in their outer sides that communicate with said openings, there being corners formed between the channels and openings, of a flexible cable connecting the slats, said cable passing through the openings in the end slats and having its ends seated in the channels, wedges driven into the openings alongside the cable and forcing the latter into engagement with the said corners, caps covering the outer sides of the channels, the ends of the cable and the wedges, said caps being located adjacent the ends of the end slats to reinforce the same at the openings thereof, and fastenings passing through the said caps and engaging in the wedges for retaining the latter in place.

3. In a mat, the combination with a plurality of spaced slats having their under portion cut away, the cut-away portions terminating short of the ends, and transverse openings through said ends, of substantially spherical separator elements interposed between the ends of the slats and having openings therethrough alined with the openings in the slats, the outermost slats furthermore having channels in their outer sides, flexible cables passing through the various alined openings and having their ends seated in the channels, there being corners formed at the ends of the said channels, nails passing through the outermost slats and cables for preventing detachment of the latter, securing means for said cables engaged with the said corners and coöperating with the nails for holding the cables connected with the outermost slats, and caps secured to said outermost slats and covering the ends of the cables and the securing means, said caps being in the form of plates extending longitudinally of the end slats adjacent the extremities thereof for forming reinforcing devices at the corners of the mat.

In testimony, that I claim the foregoing as my own, I have hereto affixed my signature in the presence of two witnesses.

FRANK G. McPHERSON.

Witnesses:
  CHAS. M. ELLIOTT,
  FRANK C. PERROTT.